(12) United States Patent
Cho et al.

(10) Patent No.: US 9,170,883 B2
(45) Date of Patent: *Oct. 27, 2015

(54) ONLINE DATA CONSISTENCY CHECKING IN A NETWORK STORAGE SYSTEM WITH OPTIONAL COMMITTAL OF REMEDIAL CHANGES

(71) Applicant: NetApp, Inc., Sunnyvale, CA (US)

(72) Inventors: Yong Cho, Campbell, CA (US); Maya Palem, Sunnyvale, CA (US); Vignesh Sukumar, Santa Clara, CA (US); John K. Edwards, Sunnyvale, CA (US); David Grunwald, Santa Clara, CA (US); Andy Kahn, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,372

(22) Filed: Jun. 17, 2014

(65) Prior Publication Data

US 2014/0372832 A1  Dec. 18, 2014

Related U.S. Application Data

(63) Continuation of application No. 12/368,158, filed on Feb. 9, 2009, now Pat. No. 8,793,223.

(51) Int. Cl.
  *G06F 17/30* (2006.01)
  *G06F 11/10* (2006.01)
  *H04L 29/08* (2006.01)

(52) U.S. Cl.
  CPC ........ *G06F 11/1076* (2013.01); *G06F 17/3007* (2013.01); *H04L 67/1097* (2013.01)

(58) Field of Classification Search
  CPC .................. G06F 11/1076; G06F 17/3007
  See application file for complete search history.

(56) References Cited

U.S. PATENT DOCUMENTS 4,849,879 A  *  7/1989  Chinnaswamy et al. ....... 706/45
5,119,377 A  *  6/1992  Cobb et al. ................. 714/38.11
(Continued)

FOREIGN PATENT DOCUMENTS

JP      02197938      8/1990

OTHER PUBLICATIONS

"Anderso et al, "A File System for Continuous Media", AMC Transaction on Computer Systems (TOCS), vol. 10, No. 4, Nov. 1992 (pp. 311-337)."

(Continued)

*Primary Examiner* — Dinku Gebresenbet
(74) *Attorney, Agent, or Firm* — Cesari and McKenna, LLP

(57) ABSTRACT

A network storage server includes a tool for detecting and fixing errors while the network storage server remains online (available for servicing client requests), which includes enabling a user to approve or disapprove remedial changes before the changes are committed. The technique bypasses the usual consistency point process for new or modified data blocks representing potential remedial changes. At a consistency point, dirty data blocks representing the potential remedial changes are written to a change log file residing outside the volume. The modified data blocks are written in sequential order to logical blocks of the change log file. In response to a user input indicating that a potential change should be committed, the corresponding modified data blocks are read from the change log file in the order in which they were written to the change log file, and they are written to persistent storage in that order.

17 Claims, 10 Drawing Sheets

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,765,151 A | 6/1998 | Senator | |
| 5,802,366 A | 9/1998 | Row et al. | |
| 5,809,245 A | 9/1998 | Zenda | |
| 5,870,757 A | 2/1999 | Fuller | |
| 5,873,118 A | 2/1999 | Letwin | |
| 5,875,444 A | 2/1999 | Hughes | |
| 5,907,672 A | 5/1999 | Matze et al. | |
| 5,931,918 A | 8/1999 | Row et al. | |
| 5,941,972 A | 8/1999 | Hoese et al. | |
| 5,987,506 A | 11/1999 | Carter et al. | |
| 6,018,779 A | 1/2000 | Blumenau | |
| 6,021,414 A | 2/2000 | Fuller | |
| 6,038,570 A | 3/2000 | Hitz et al. | |
| 6,065,037 A | 5/2000 | Hitz et al. | |
| 6,070,254 A | 5/2000 | Pratt et al. | |
| 6,138,126 A | 10/2000 | Hitz et al. | |
| 6,145,094 A | 11/2000 | Shirriff et al. | |
| 6,192,408 B1 | 2/2001 | Vahalia et al. | |
| 6,425,035 B2 | 7/2002 | Hoese et al. | |
| 6,467,048 B1 * | 10/2002 | Olarig et al. | 714/6.32 |
| 6,499,039 B1 | 12/2002 | Venkatesh et al. | |
| 6,530,038 B1 | 3/2003 | Hughes et al. | |
| 6,560,702 B1 | 5/2003 | Gharda et al. | |
| 6,564,228 B1 | 5/2003 | O'Connor | |
| 6,564,318 B1 | 5/2003 | Gharda et al. | |
| 6,584,582 B1 | 6/2003 | O'Connor | |
| 6,643,750 B2 | 11/2003 | Achiwa et al. | |
| 6,647,400 B1 | 11/2003 | Moran | |
| 6,684,229 B1 | 1/2004 | Luong et al. | |
| 6,691,245 B1 | 2/2004 | DeKoning | |
| 6,725,392 B1 | 4/2004 | Frey et al. | |
| 6,732,124 B1 | 5/2004 | Koseki et al. | |
| 6,751,637 B1 | 6/2004 | Hitz et al. | |
| 6,816,891 B1 | 11/2004 | Vahalia et al. | |
| 6,850,955 B2 | 2/2005 | Sonoda et al. | |
| 6,857,001 B2 | 2/2005 | Hitz et al. | |
| 6,895,413 B2 | 5/2005 | Edwards | |
| 6,928,466 B1 | 8/2005 | Bulka et al. | |
| 6,934,722 B1 | 8/2005 | Goshey et al. | |
| 6,988,171 B2 | 1/2006 | Beardsley et al. | |
| 7,076,509 B1 | 7/2006 | Chen et al. | |
| 7,243,207 B1 | 7/2007 | Edwards | |
| 7,257,690 B1 * | 8/2007 | Baird | 711/162 |
| 7,269,696 B2 | 9/2007 | Muhlestein et al. | |
| 7,322,010 B1 * | 1/2008 | Mikula | 715/734 |
| 7,499,959 B2 | 3/2009 | Edwards | |
| 2002/0083120 A1 | 6/2002 | Soltis | |
| 2002/0091670 A1 | 7/2002 | Hitz et al. | |
| 2002/0169998 A1 | 11/2002 | Largman et al. | |
| 2002/0178176 A1 | 11/2002 | Sekiguchi et al. | |
| 2003/0028514 A1 | 2/2003 | Lord et al. | |
| 2003/0069902 A1 | 4/2003 | Narang et al. | |
| 2003/0078946 A1 | 4/2003 | Costello et al. | |
| 2003/0101383 A1 | 5/2003 | Carlson | |
| 2003/0105767 A1 | 6/2003 | Sonoda et al. | |
| 2003/0182312 A1 | 9/2003 | Chen et al. | |
| 2003/0182313 A1 | 9/2003 | Federwisch et al. | |
| 2003/0182398 A1 | 9/2003 | Morlang et al. | |
| 2003/0191810 A1 | 10/2003 | Muhlestein et al. | |
| 2003/0195942 A1 | 10/2003 | Muhlestein et al. | |
| 2004/0260673 A1 | 12/2004 | Hitz et al. | |
| 2005/0010529 A1 * | 1/2005 | Zalewski et al. | 705/54 |
| 2005/0038803 A1 | 2/2005 | Edwards | |
| 2005/0187983 A1 | 8/2005 | Narang et al. | |
| 2005/0228942 A1 * | 10/2005 | Nichols et al. | 711/114 |
| 2006/0089953 A1 | 4/2006 | Chen et al. | |
| 2006/0179261 A1 | 8/2006 | Rajan | |
| 2007/0094354 A1 | 4/2007 | Soltis | |

OTHER PUBLICATIONS

"Common Internet File System (CIFS) Version: CIFS-Spec 0.9. Storage Networking Industry Association (SNIA), Draft SNIA CIFS Documentation Work Group Work-in-Progress, Revision Data: Mar. 26, 2001."

"Hitz et al., "File System Design for an NFS File Server Applianc" Network Appliance, USENIX Winter 1994, San Francisco, California (Technical Report 3002)."

"NonFinal Office Action Mailed Jul. 16, 2013 U.S. Appl. No. 12/368,158, filed Feb. 9, 2009, 24 pages."

"Peacock et al., "Fast Consistency Checking for Solaris File System", Sun Microsystems Computer Company-USEUNIX, New Orleans, Louisiana, Jun. 1998."

"Sivathanu, Gopalan, et al., "Ensuring Data Integrity in Storage: Techniques and Applications," 2005, ACM, 1-22."

"Uresh Vahalia, "File System Implementations", Unix Internals, The Frontier, Chapter 9, Prentice Hall, Inc., Upper-Saddler River, New Jersey, 1996 (pp. 261-289)."

"Uresh Vahalia, Unix Internals: The Frontier, Chapter 9, "File System Implemmentations", Prentice Hall, Inc., Upper-Saddler River, New Jersey, 1996 (pp. 261-289)."

"Vertual Interface Architecture Specification, Version 1.0 published by a collaboration between Compac Computer Corp., Intel Corp., and Microsoft Corp., Dec. 16, 1997."

Non-Final Office Action mailed Aug. 25, 2011 for U.S. Appl. No. 12/368,158, filed Feb. 9, 2009.

Final Office Action mailed Jan. 17, 2012 for U.S. Appl. No. 12/368,158, filed Feb. 9, 2009.

Advisory Action mailed Apr. 5, 2012 for U.S. Appl. No. 12/368,158, filed Feb. 9, 2009.

Sivathanu, Gopalan; Charles P. Wright, Erez Zadok, "Ensuring Data Integrity in Storage: Techniques and Application", 2005, AMC, 1-22.

* cited by examiner

ONLINE DATA CONSISTENCY CHECKING IN A NETWORK STORAGE SYSTEM WITH OPTIONAL COMMITTAL OF REMEDIAL CHANGES

PRIORITY CLAIM

This application is a continuation of U.S. patent application Ser. No. 12/368,158, entitled "ONLINE DATA CONSISTENCY CHECKING IN A NETWORK STORAGE SYSTEM WITH OPTIONAL COMMITTAL OF REMEDIAL CHANGES" and filed on Feb. 9, 2009, which is expressly incorporated by reference herein.

FIELD OF THE INVENTION

At least one embodiment of the present invention pertains to network storage systems, and more particularly, to a technique for online data consistency checking in a network storage system with optional committal of remedial changes.

BACKGROUND

Most computer-based processing systems today include some form of file system to manage and organize stored data. A file system is a structure of stored data and associated metadata, which is often hierarchical in nature. A file system can be based on the notion "files" as the basic units of data upon which it operates; alternatively, a file system can be based on other basic units of data instead of, or in addition to files, such as sub-file-level data blocks. Thus, the term "file system" as used herein is not limited to a system that is capable of managing data in the form of files per se.

A network storage controller is an example of a type of processing system that includes a file system. This form of processing system is commonly used to store and retrieve data on behalf of one or more hosts on a network. A storage server is a type of storage controller that operates on behalf of one or more clients on a network, to store and manage data in a set of mass storage devices, such as magnetic or optical storage-based disks or tapes. Some storage servers are designed to service file-level requests from hosts (clients), as is commonly the case with file servers used in a network attached storage (NAS) environment. Other storage servers are designed to service block-level requests from hosts, as with storage servers used in a storage area network (SAN) environment. A "block" in this context is the smallest addressable unit of contiguous data that can be addressed in a file system. Still other storage servers are capable of servicing both file-level requests and block-level requests, as is the case with certain storage servers made by NetApp, Inc. of Sunnyvale, Calif.

Almost any file system can experience occasional data errors or corruption, particularly large-scale file systems such as used in modern storage servers. The larger and more complex the system is, the more likely it is to experience such errors. Consequently, network storage systems and other types of processing systems are usually equipped with some form of tool to detect and fix (when possible) such errors in a file system. Typically the tool is implemented in software.

Examples of such a tool include the UNIX based fsck program and the chkdsk command on Microsoft Windows® based systems. These tools typically execute while the file system being verified is off-line, i.e., while the file system not available for servicing of client requests.

Some file system check tools are implemented in network storage systems. In such cases, the tool is normally invoked by an administrative user, such as a storage network administrator. Examples of the functions performed by such a tool include block allocation testing to make sure that each block is properly allocated and that pointers to the block are proper. Such a tool also typically looks for other file system corruptions, such as inconsistencies in inodes and space accounting (e.g., incorrect block counts).

At least one prior art file system check tool implemented in a network storage server can recommend to the user remedial changes to the file system to fix any detected errors, and enables the user to approve or disapprove the changes before committing them to the file system. However, this tool requires the entire storage server to be off-line while the checking and fixing processes are being executed on any data volume in the storage server. In a storage system which stores large amounts of data, such as an enterprise network storage system, these processes can take hours. It is very undesirable for data to remain inaccessible to users for such long periods of time. In addition, this tool uses a very large amount of random access memory (RAM) while it runs.

Another prior art file system consistency check tool implemented in a network storage server is able to save changes (error fixes) and status information to persistent storage (e.g., disks) while it runs, thereby consuming less RAM. It is also designed so that the volumes of the storage server remain online (i.e., accessible for servicing client requests) for at least part of the time that the tool runs. The entire aggregate which contains the volume being checked is taken offline temporarily (an aggregate is a group of physical storage), so all volumes in that aggregate will be unavailable during that period; however, the aggregate can go back online after the tool completes an initial remount phase, and all volumes become available at that time.

This tool also can determine changes that are needed to fix detected errors. However, it does not enable the user to approve or disapprove the remedial changes before they are committed to the file system; rather, the remedial changes are automatically committed. That is because this tool uses a built-in "consistency point" process in the storage server to commit the changes. A consistency point is an event (typically a recurring event) at which new or modified data buffered in RAM is committed to allocated locations in persistent storage to preserve a consistent image of the file system.

SUMMARY

Introduced here is a technique for detecting and fixing data and metadata errors in a network storage server, while the entire network storage server remains online (available for servicing client requests), which includes enabling a user to approve or disapprove proposed remedial changes explicitly before any such changes are committed. In one embodiment the technique involves detecting errors in a volume of a network storage server while the network storage server remains online, and identifying potential changes to the volume for resolving the errors, while the network storage server remains online. The technique bypasses the usual consistency point process for new or modified data blocks representing potential remedial changes. The technique enables more online time of the storage server and allows availability of aggregates that are not being checked. The entire storage server does not need to be taken offline during the checking or fixing process.

In particular, at a consistency point event, buffered new or modified ("dirty") data blocks representing the potential changes are written to a change log file that resides outside the volume, rather than immediately writing them to their allocated persistent storage locations. This may include writing the modified data blocks in a sequential order to logical blocks of the change log file. The use of such a change log file outside the file system being checked allows a user to approve or disapprove remedial changes before they are committed to stable storage. In response to a user input indicating that the potential change should be committed, the modified data blocks are read from the change log file and written to a persistent storage facility of the storage server. This may include reading the modified data blocks from the change log file in the order in which they were written to the change log file and writing them to the persistent storage facility in that same order. If the potential changes are disapproved by the user, then the change log and other metadata related to the checking/fixing process are discarded, and the potential changes are not written to the persistent storage facility.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
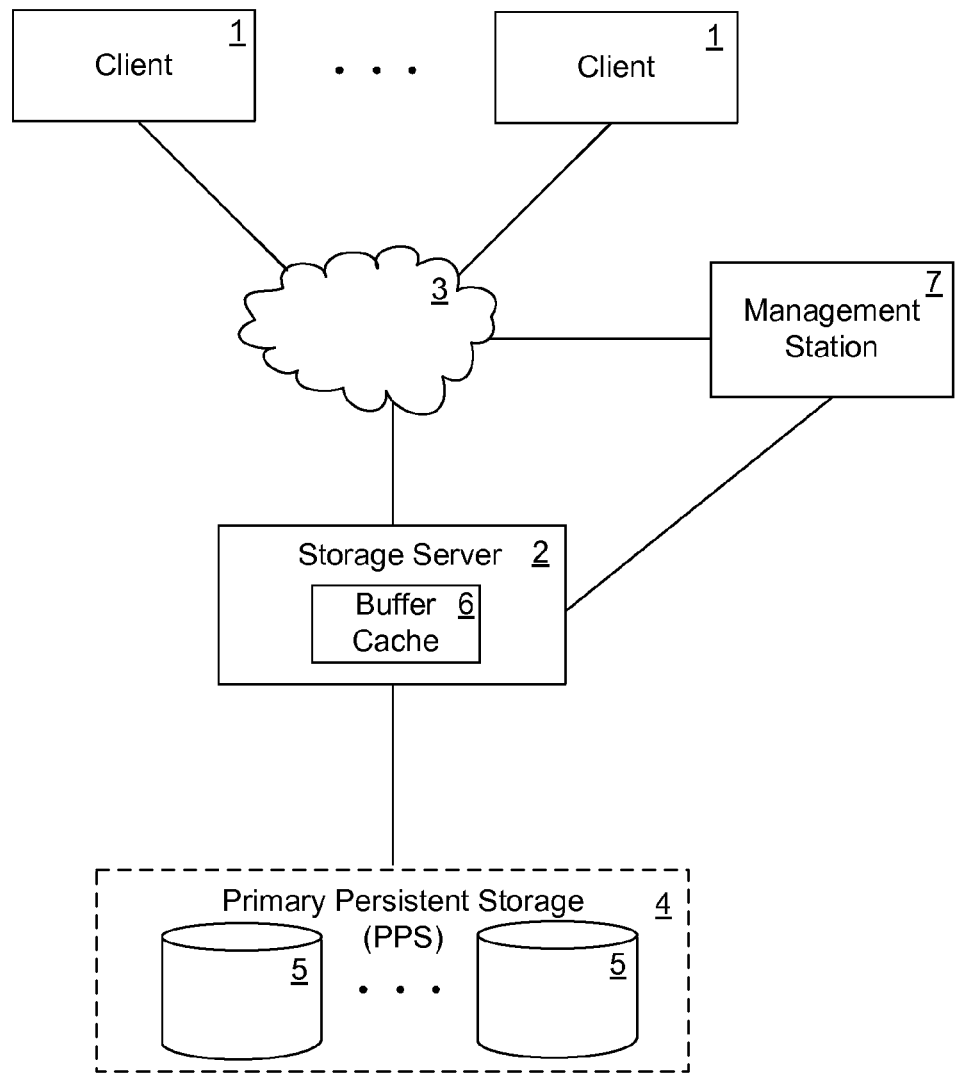
FIG. 1, which shows a network storage system in which the technique introduced here can be implemented.

FIG. 1 illustrates a network storage environment in which the technique introduced here can be implemented. In one embodiment, the technique is implemented as part of a tool (or tools) that executes on and/or resides in a storage server, such as storage server 2 illustrated in FIG. 1. Note, however, that the technique is not necessarily limited in applicability to storage servers or to network storage systems.

In FIG. 1, the storage server 2 is coupled to a primary persistent storage (PPS) subsystem 4 and is also coupled to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, directed to data stored in or to be stored in the storage subsystem 4. The PPS subsystem 4 includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in PPS subsystem 4 can be organized as a Redundant Array of Inexpensive Disks (RAID), in which case the storage server 2 accesses the storage subsystem 4 using a RAID algorithm for redundancy.

Also connected to the storage server 2, either directly or through the network 3 (or both), is a management station 7. Through the management station 7, a user such as a network administrator can manage various functions and aspects of the storage server 2 and the PPS 4. For example, the management station 7 may provide a user interface that allows the user to invoke the checking process and to accept or reject potential remedial changes identified by the checking process.

The storage server 2 may provide file-level data access services to clients 1 such as commonly done in a NAS environment, or block-level data access services such as commonly done in a SAN environment, or it may be capable of providing both file-level and block-level data access services to clients 1. Further, although the storage server 2 is illustrated as a single unit in FIG. 1, it can have a distributed architecture. For example, the storage server 2 can be designed as a physically separate network module (e.g., "N-blade") and disk module (e.g., "D-blade") (not shown), which communicate with each other over some type of interconnect. Such an architecture allows convenient scaling, such as by deploying clusters of two or more N-modules and D-modules, all capable of communicating with each other through the interconnect.

The storage server 2 includes a storage operating system to control its basic operations (e.g., reading and writing data in response to client requests). In certain embodiments, the storage operating system is implemented as software and/or firmware in the storage server 1.

Figure 2A:
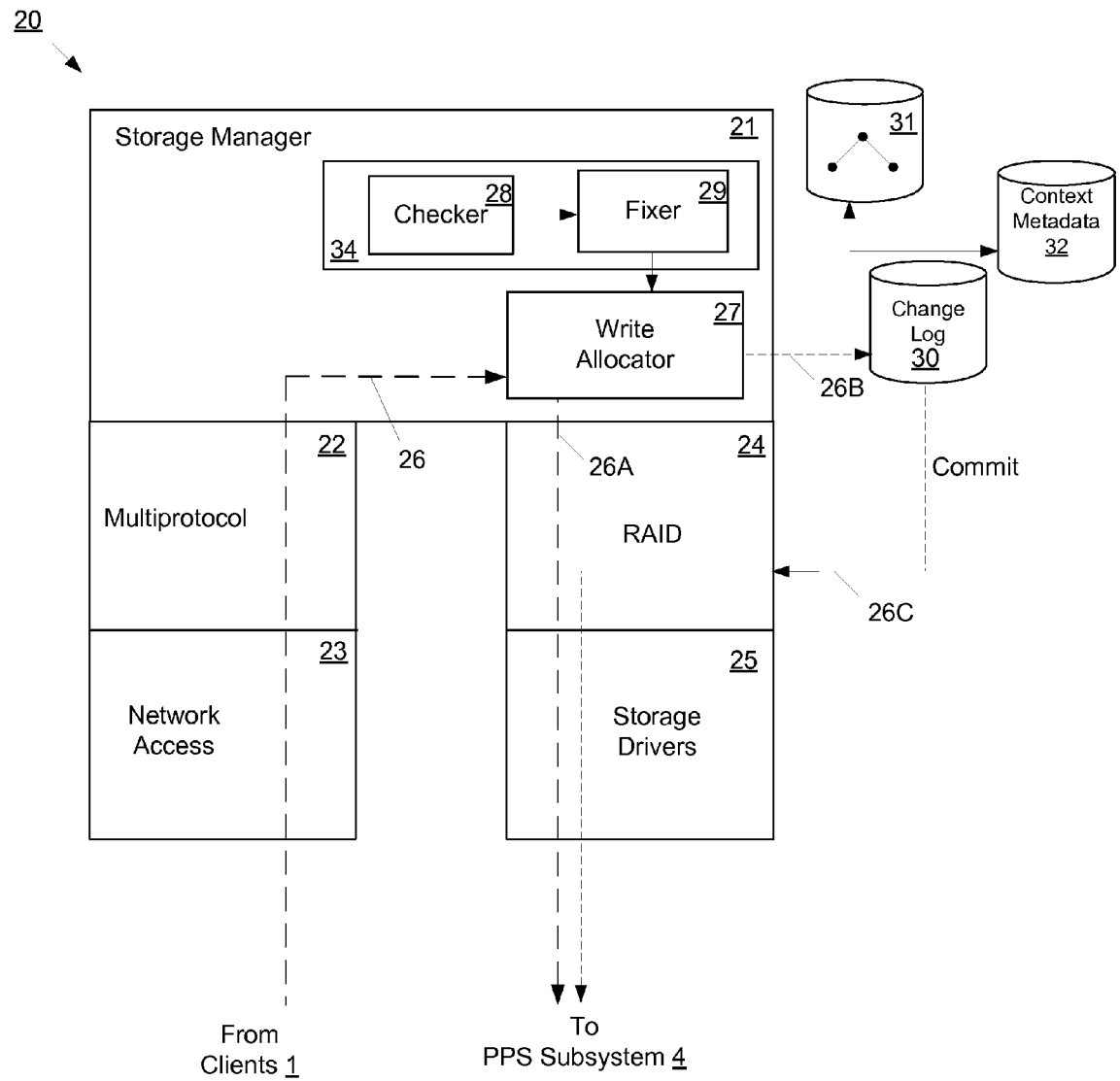
FIG. 2A is a block diagram of the architecture of a storage operating system in a storage server, showing logic and data paths associated with write operations.
Figure 2B:
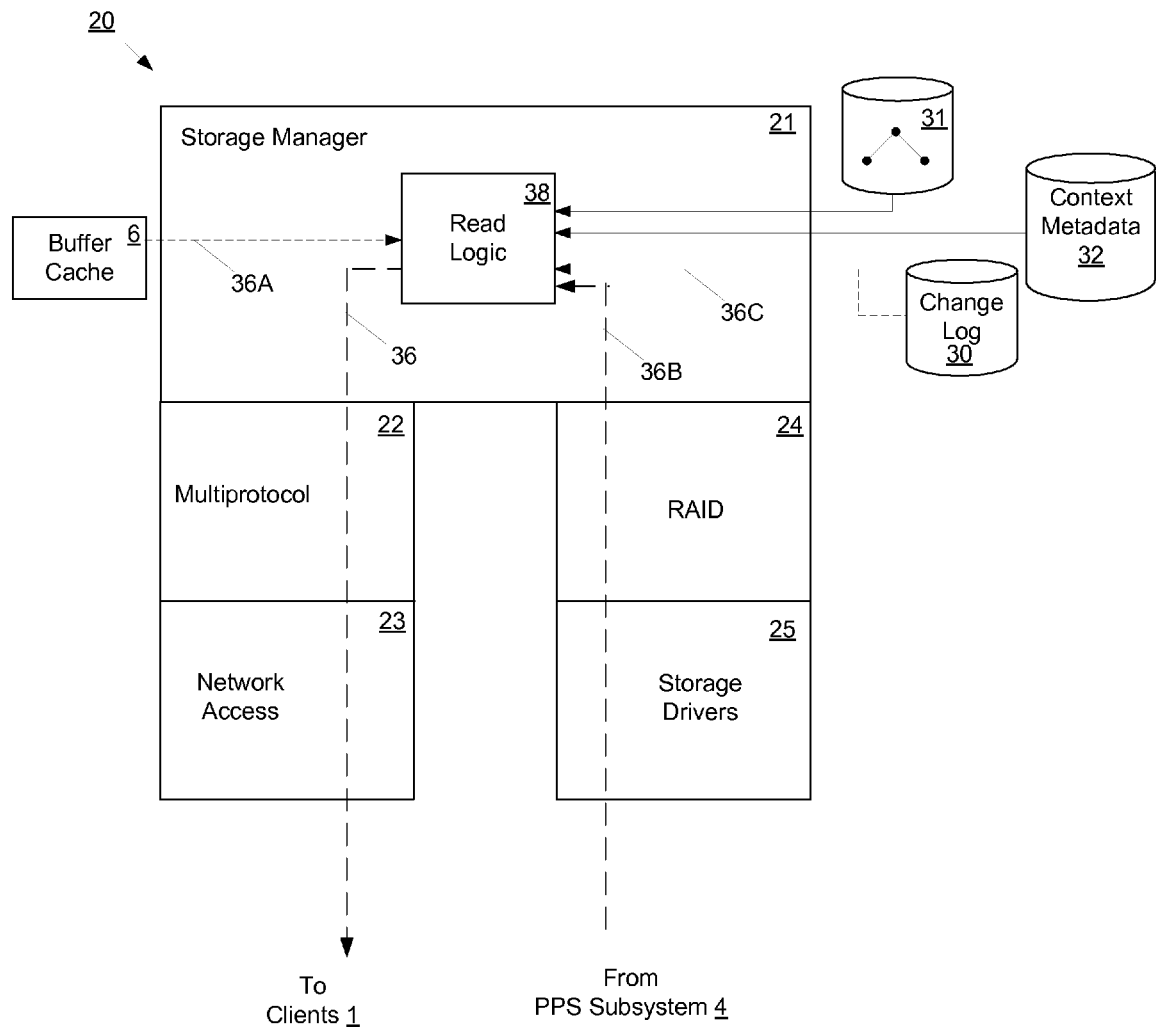
FIG. 2B is a block diagram of the architecture of a storage operating system in a storage server, showing logic and data paths associated with read operations.

FIGS. 2A and 2B schematically illustrate an example of the architecture of the storage operating system in the storage server 2. In the illustrated embodiment, the storage operating system 20 includes several modules, or "layers", which can be (but are not necessarily) layers within a protocol stack. These layers include a storage manager 21, which is the core functional element of the storage operating system 20. The storage manager 21 imposes a structure (e.g., a hierarchy) on the data stored in the PPS subsystem 4 and which services read and write requests from clients 1. To improve performance, the storage manager 21 accumulates batches of writes in the buffer cache 6 (FIG. 1) of the storage server 2 and then streams them to the PPS subsystem 4 as large, sequential writes.

The storage manager 21 manages one or more volumes. A "volume" is a logical data set which is an abstraction of physical storage, combining one or more physical mass storage devices (e.g., disks) or parts thereof into a single logical storage object, and which is managed as a single administrative unit, such as a single file system. A volume may be defined from a larger group of available physical storage, called an aggregate. A volume may be logically broken down into logical data sets (storage objects) called "plexes", which may contain one or more RAID groups.

To allow the storage server 2 to communicate over the network 3 (e.g., with clients 1), the storage operating system 20 also includes a multiprotocol layer 22 and a network access layer 23, logically "under" the storage manager 21. The multiprotocol 22 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 23 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also, to allow the storage server 2 to communicate with the persistent storage subsystem 4, the storage operating system 20 includes a RAID layer 24 and an associated storage driver layer 25 logically under the storage manager 21. The RAID layer 24 implements a higher-level disk storage protocol, such as RAID-4, RAID-5 or RAID-DP, while the storage driver layer 25 implements a lower-level storage device access protocol, such as Fibre Channel Protocol (FCP) or small computer system interface (SCSI).

Also shown in FIG. 2A are the paths of data flow (represented by dashed lines 26, 26A, 26B, 26C) through the storage operating system 20, associated with a write operation, from the client interface to the PPS interface. Thus, the storage manager 21 accesses the PPS subsystem 4 through the RAID layer 24 and the storage driver layer 25.

The storage manager 21 includes a checker/fixer tool 34 and a write allocator 27. The main function of the write allocator 27 is to allocate free data blocks on disk when data is to be written to storage. The checker/fixer tool 34 includes a checker 28 and a fixer 29. The main function of the checker 28 is to scan any volume managed by the storage server 2 to detect errors of various types. The main function of the fixer 29 is to identify potential remedial changes to fix such errors, and to commit the remedial changes to the file system after a user has approved them.

To detect the errors and identify potential remedial changes, the checker 28 and fixer 29 can perform functions such as done by conventional file system checking/fixing tools that are well-known in the art, such as UNIX's fsck, for example. The specific types of errors that can be detected and the corresponding remedial changes is not germane to the technique introduced here. In the illustrated embodiment the checker 28 and fixer 29 are components of the storage manager 21. In other embodiments, however, either or both of these elements can be implemented in other layers of the storage operating system 20, or as separate elements of the storage operating system 20, or they may be implemented separately from the storage operating system 20 or even external to the storage server 2.

The storage operating system 20 can have a distributed architecture. For example, the multiprotocol layer 22 and network access layer 23 can be contained in an N-module (e.g., N-blade) while the storage manager 21, RAID layer 24 and storage driver layer 25 are contained in a separate D-module (e.g., D-blade). The N-module and D-module communicate with each other (and, possibly, other N- and D-modules) through some form of physical interconnect.

As noted above, at least one prior art file system checker/fixer tool implemented in a storage server did not allow the user to approve or disapprove remedial changes before committing the changes to the file system. Instead, the remedial changes were automatically committed. That is because that tool used a built-in "consistency point" process in the storage server to commit the changes. A consistency point is a recurring event, generated by the storage operating system, at which new or modified data buffered in RAM is committed to allocated locations in persistent storage, to preserve a consistent image of the file system.

Between consistency points, new and modified data blocks are buffered in the buffer cache 6 in the form of a tetris or multiple tetrises. A tetris is a group of blocks that the write allocator 27 has linked together so that they can be written together in parallel to the persistent storage subsystem 4. Normally at a consistency point, these buffered ("dirty") data blocks are written to persistent storage, e.g., disks. In a conventional storage server, this involves the storage manager sending each tetris of dirty data blocks in the buffer cache down to the RAID layer, which would then write those dirty data blocks to disk in parallel according to a RAID protocol. In a conventional storage system, a consistency point may occur at predetermined time intervals (e.g., every 10 seconds), for example, or in response to a predefined condition (e.g., the buffer cache being filled to some threshold fraction of its capacity).

The technique introduced here provides the ability for users to approve or disapprove potential remedial changes to a volume, in part by using a separate thread of the write allocation logic in the storage manager for writing dirty data blocks representing potential remedial changes. This separate thread causes a write redirection which bypasses the usual writing of data to persistent storage for potential remedial changes, such that the potential remedial changes do not automatically get committed to persistent storage at the next consistency point. Referring again to FIG. 2A, write paths 26B and 26C together form an alternative path to write path 26A. No physical writes are allowed to the disks in the volume being checked, until the user accepts or rejects the potential remedial changes. This technique does not require any modification of the normal write allocation logic, although writes caused by the checker/fixer logic are directed to a different location than they would otherwise go to (e.g., another volume). The volume being checked is placed into a mode in which it is unavailable for client access while it is being checked and fixed, although the storage server and all other volumes that it manages remain online during those processes.

Referring again to FIG. 2A, at a consistency point event any dirty data blocks representing potential remedial changes are written by a separate thread of the write allocator 27 to a change log file 30; such blocks are not immediately (if ever) passed to the RAID layer 24 or written to their allocated locations in the PPS subsystem 4. All writes for volumes that are not being checked go through the normal write allocation thread(s).

The change log file 30 is a special, append-only system file that resides outside the volume being checked. The change log file 30 may reside essentially anywhere outside the volume being checked, such as in the root volume of the storage server 2, as just one example. Note that the volume being checked is taken off-line during the checking and fixing processes and is brought back online only after the proposed changes are explicitly accepted or rejected by the user. The change log 30 is deleted after the volume is brought back online.

In one embodiment, when a consistency point occurs during the checking/fixing process, dirty data blocks representing the potential changes are appended to the change log file 30 in a sequential order, maintaining their tetris ordering from the buffer cache 6, to logical blocks of the change log file. The logical blocks of the change log file are called file block numbers (FBNs). An FBN is a pointer that indicates the logical (sequential) position of a data block within a particular file. In one embodiment, every data block within every file maintained by the storage server 2 has an FBN. Every data block managed by the storage server 2 also has a separate physical volume block number (PVBN), which is the address of a physical location on a physical storage device, such as a disk, where that data block is stored and is used to identify the data block in communication between the RAID layer 24 and the storage manager 21. As such, a PVBN is a RAID-level physical block pointer.

Information indicating the errors detected and the potential remedial changes is output to a user, such as on a visual display device and/or in printed output. The specific nature of such output is not germane to the technique introduced here. Nonetheless, such information may include identification of specific blocks by their containing file's filenames, their FBNs and/or PVBNs, etc. In some embodiments, the user is given the option to select, via an appropriate user interface, all of the potential changes or none of the potential changes to be committed to the file system. In other embodiments, the user may be given the option to select, via an appropriate user interface, any individual potential change or changes to be committed or not committed to the file system.

In response to a user input indicating that a potential remedial change should be committed (where such user input may be entered via the management station 7, for example), the modified data blocks representing that change are read from the change log file 30 in the same order that they were written to the change log file 30, and they are then passed to the RAID layer 24 in that order to cause them to be written to the PPS subsystem 4, to the same PVBNs which they would have been written to if they had been passed directly to the RAID layer 24 from the storage manager 21 at a consistency point. If the changes are disapproved by the user, then the change log 30 and any other metadata related to the checking/fixing process are discarded, and the potential changes are not written to the PPS subsystem 4.

In one embodiment, no client-initiated operations are permitted on a volume while the checking or fixing process is running on that volume. This can be accomplished by putting the volume in a special mounted state, e.g., "check restricted". While the volume is in this state, only the checker/fixer can write data to the volume. In another embodiment, this is done by setting a special flag in metadata of the volume.

However, reads and writes initiated by the storage manager 21 are permitted during the checking/fixing process. When a read request is issued for a data block representing a potential remedial change during the checking/fixing process, the storage server 2 will attempt to locate the block in the change log file 30 if it is not initially found in the buffer cache 6. If the block is found in the change log file 30, it will be served to the requester from the change log file 30. Otherwise, the request will be passed to the RAID layer 24 (as done for a normal read request), which will retrieve the block from the PPS subsystem 4.

To provide faster lookups during reads, in one embodiment a B-plus tree 31 is used to map the PVBN of each data block representing potential remedial change to the corresponding FBN of the change log file 30. The technique also uses a separate file system context file 32 outside the volume being checked, to store file system context metadata associated with the blocks that are stored in the change log file 30, as discussed further below.

Figure 3:
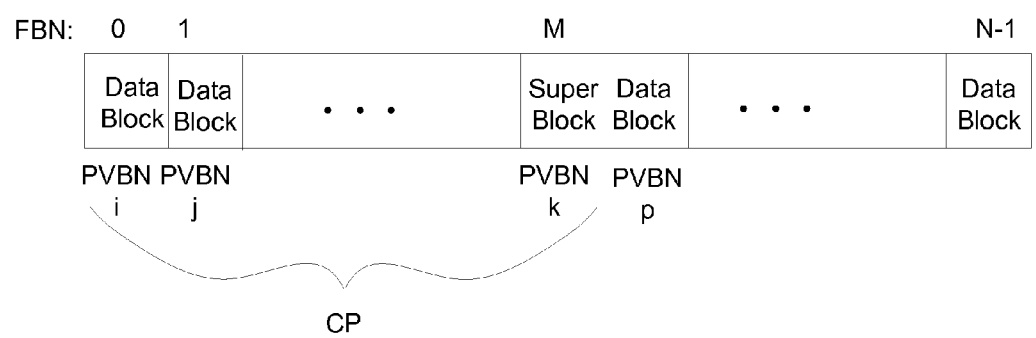
FIG. 3 schematically shows an example of a change log file.

FIG. 3 schematically shows an example of the change log file 30. The change log file 30 is a file stored outside the volume being checked, such as in the root volume of the storage server 2. The change log file 30 has some number (N) of FBNs, which are logical block pointers for the data blocks 35 of the change log file 30. Each block 35 of the change log file 30, when filled, contains a new or modified data block for implementing a potential remedial change to the volume. Each such data block also is allocated a unique PVBN (e.g., PVBN l, PVBN, j, PVBN k, PVBN l) by the write allocator 27.

Figure 4:
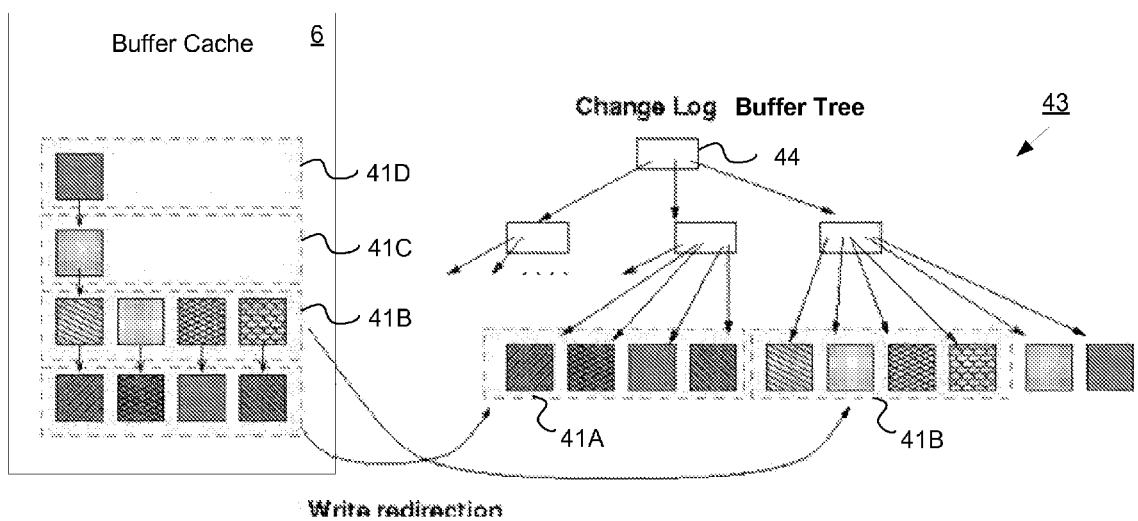
FIG. 4 schematically illustrates the writing of blocks representing potential remedial changes from a buffer cache to the change log file.

FIG. 4 further illustrates how dirty blocks representing potential remedial changes are written from the buffer cache 6 to the change log file 30. Dirty blocks are stored in the form of one or more tetrises 41A-41D in the buffer cache. In one embodiment, each tetris 41 includes up to four 4 KByte data blocks 42. In other embodiments, a tetris can include a different number of data blocks, and data blocks may be a size other than 4 KByte. In the illustrated embodiment, the change log file 30 is structured hierarchically in the form of a buffer tree 43, as are other files in the storage system. A buffer tree in this context is a hierarchical data and metadata structure (e.g., a linked list) used by the storage manager to keep track of the locations of the data blocks of a file, and the root of which is an inode 44 (a special metadata block) of the file. A buffer tree includes one or more levels of indirect blocks (called "L1 blocks", "L2 blocks", etc.), each of which contains one or more pointers to lower-level indirect blocks and/or to the actual data blocks ("direct" blocks or "L0" blocks) of the file. Each direct block of the change log file has an FBN that indicates the block's logical position within the change log file. As shown in FIG. 4, at a consistency point, dirty data blocks 42 in the buffer cache 6 that represent potential remedial changes are appended in sequential order, according to the tetris order they have in the buffer cache 6, to sequential FBNs (direct blocks) of the change log file.

Figure 5:
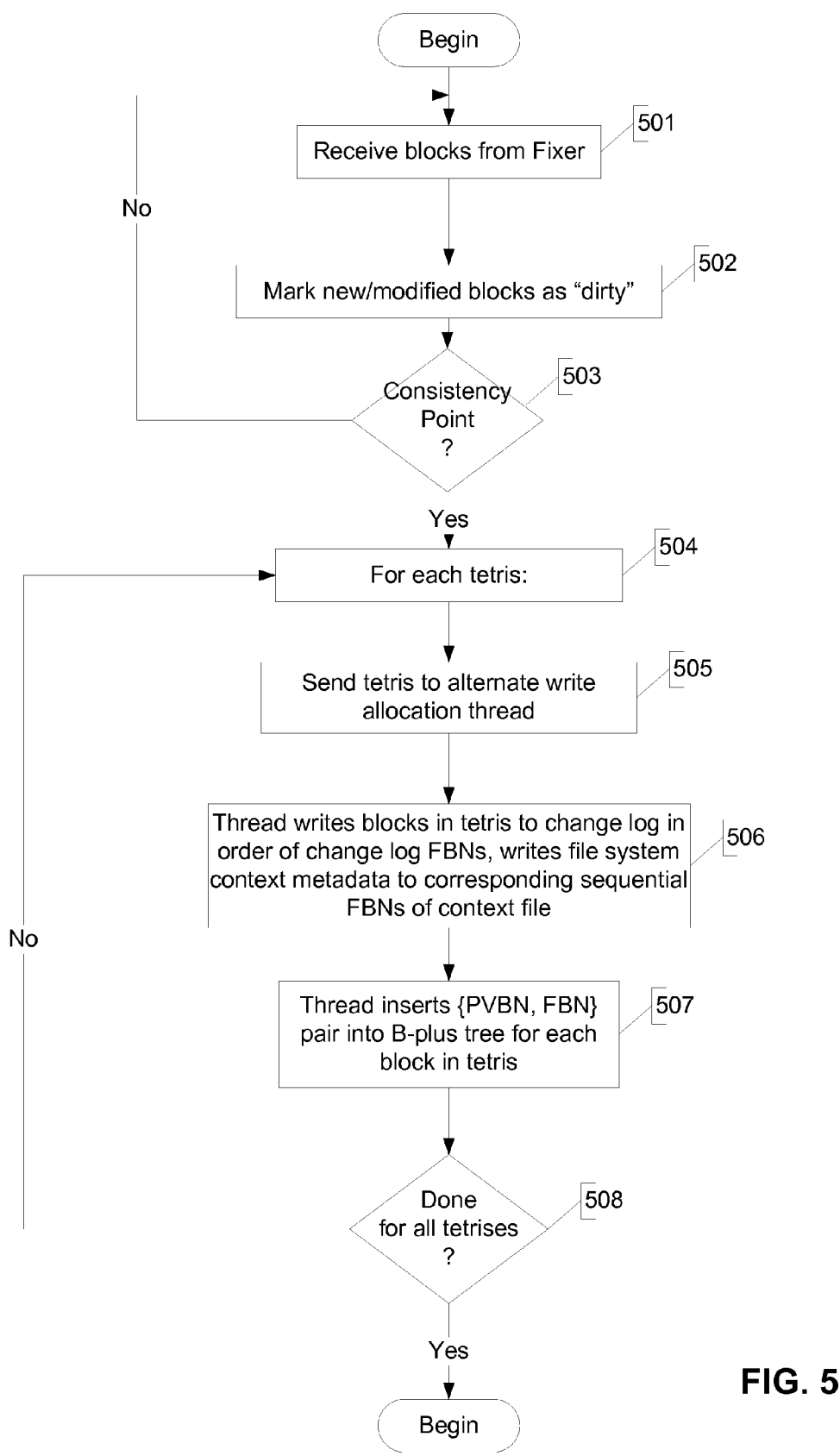
FIG. 5 is a flow diagram illustrating a process of performing write redirection for potential remedial changes.

FIG. 5 illustrates in greater detail the process of performing write redirection such as described above, for potential remedial changes. The entire checking/fixing process can actually span multiple consistency points, although to simplify explanation only one consistency point is represented in the process of FIG. 5 (503).

Initially, at 501 the write allocator 27 receives from the fixer 29 one or more new or modified data blocks representing the potential changes. The write allocator 27 then causes each such block to be marked as dirty at 502, such that it can be "cleaned" at the next consistency point. At that time, each such data block is assigned a unique PVBN and the blocks are formed in tetrises along with other dirty blocks, if any. Note that tetrises are formed from dirty blocks during consistency point even independently of the checker/fixer processes (as mentioned above). Also, a tetris can include not only the blocks modified by the fixer 29, but also other metadata blocks that the storage manager 21 modifies for write allocation, such as active bitmap blocks, superblocks, etc. (an active bitmap is a bitmap that indicates which blocks in a file system are in use and which blocks are not in use; a superblock is the root metadata block of a volume, from which all data blocks that reside in the volume can be located). All such blocks would be redirected during the write process, not just the actual data blocks modified by the fixer 29.

At the next consistency point (503), the following operations are performed for each tetris (504, 508): At 505 the tetris is sent to an alternate thread of the write allocator 27, i.e., not the usual write allocation thread invoked during a consistency point. Next, at 506 the alternate write allocator thread appends the tetris to the change log file 30, by storing these blocks in sequential FBNs of the change log file 30. In one embodiment a superblock occupies the last block of each tetris written to the change log file 30. In other embodiments, multiple new tetrises are written to the change log file 30 without any superblock, followed by a superblock. The inclusion of the superblock in this write redirection process can be used to enable faster recovery if a system crash occurs during the process, as described below.

In one embodiment, if a system crash were to occur during this process, the system would know that the change log file 30 is correct at least up to the last superblock appended to the change log file 30. After recovery, therefore, the process of writing to the change log file 30 only needs to be resumed from the point just after the last superblock in the change log file 30, as opposed to regenerating the entire change log file.

Also at 506, the alternate write allocator thread writes file system context metadata associated with these blocks to sequential FBNs of the file system context file 32. An FBN of the file system context file 32 can contain file system context metadata for one or more data blocks. The file system context metadata for any given data block can include, for example, the buffer tree identifier of the file that contains the block, the FBN of the block within the file, the consistency point count of the volume in which the block is being written, etc. Then, at 507 the alternate write allocator thread inserts the PVBN and FBN of each data block in the change log file 30 as a pair into the B-plus tree 31, to facilitate faster lookup during any subsequent reads of those data blocks. Note that other embodiments, a different type of data structure could be substituted for the B-plus tree 31, such as a hash table. In one embodiment, the changes made at 506 and 507 are done in memory only, not in the PPS subsystem 4.

Figure 6:
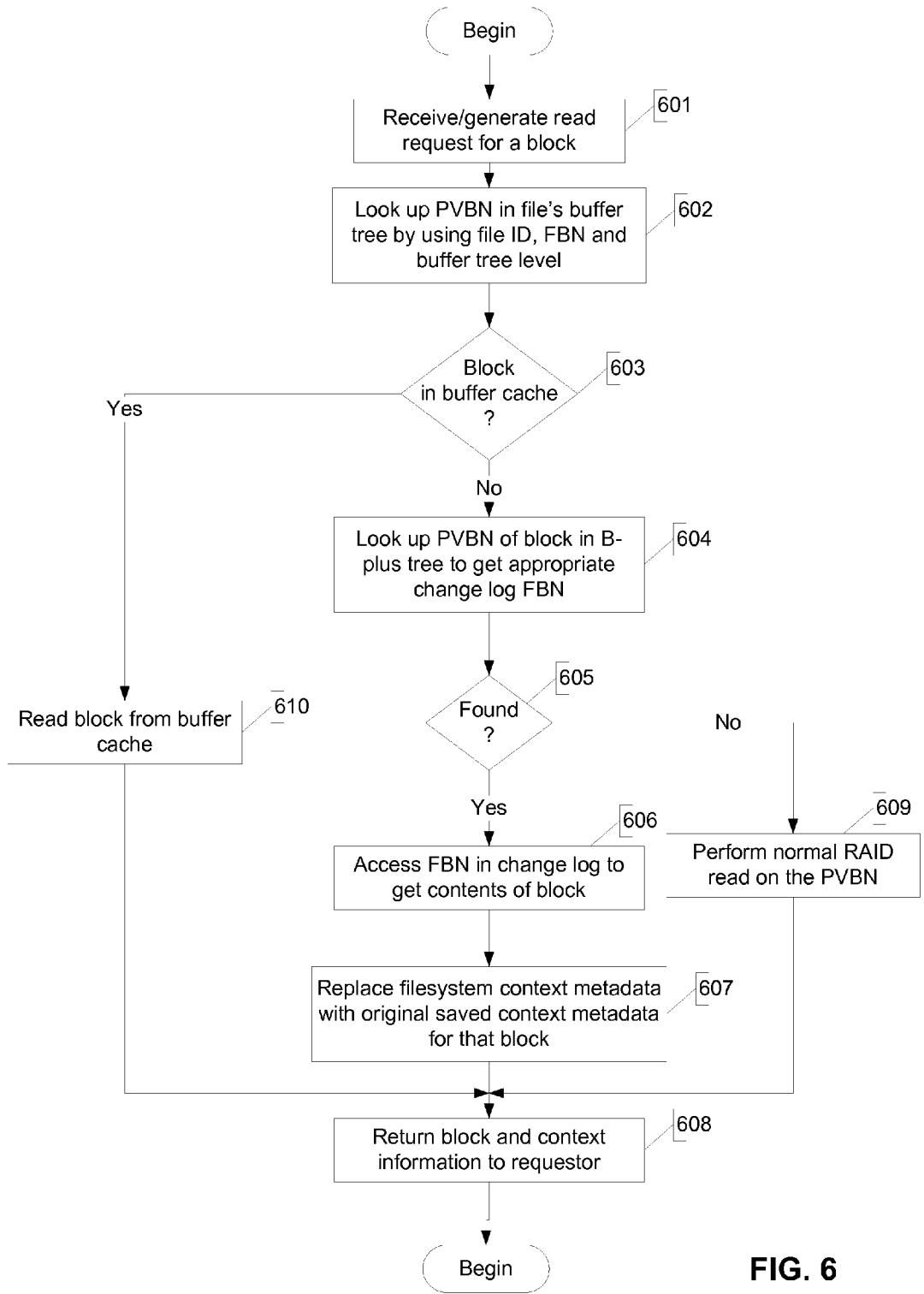
FIG. 6 is a flow diagram illustrating a process of handling a read request for a block stored in the change log file.
Figure 7:
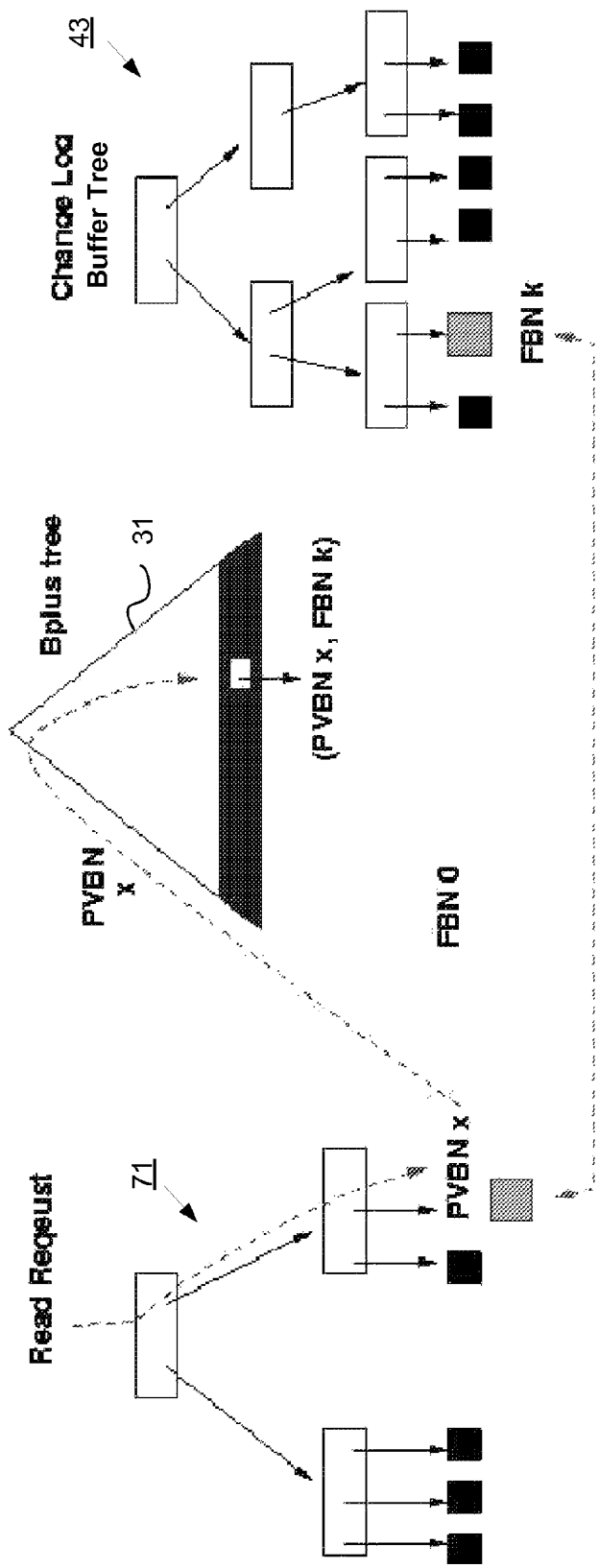
FIG. 7 schematically illustrates a process of serving a read request for a block stored in the change log file.

FIG. 6 illustrates in greater detail the process of handling a read request for a block stored in the change log file 30. Reference is also made here to FIG. 2B, which shows the possible data paths for a read, represented by dashed lines 36, 36A, 36B and 36C. The process is also described with reference to FIG. 7.

Initially, at 601 the read request is received or generated (e.g., by read logic 38) by the storage manager 21. At 602 the storage manager 21 looks up the PVBN, e.g. PVBN X, of the data block in the buffer tree 71 of the file that contains the data block ("the file" here refers to the actual file within the volume that contains the block, not the change log file). The read request can be assumed to contain the file ID, FBN and buffer tree level of the data block being requested, or metadata sufficient to enable a lookup of those values. Accordingly, the storage manager 21 uses the file ID, FBN and buffer tree level to "walk" down the buffer tree 71 of the file in order to identify the PVBN of the requested data block. The storage manager 21 then determines at 603 whether the requested block is in the buffer cache 6. If the requested block is in the buffer cache 6, then at 610 the storage manager 21 reads the block from the buffer cache 6 and then returns the block and its relevant context information to the requester at 608.

On the other hand, if the requested block is not found in the buffer cache 6 at 603, then the process proceeds to 604, where the storage manager 21 uses the PVBN determined at 602 to perform a lookup in the B-plus tree 31 of the FBN of the data block in the change log file 30. If that PVBN is not found in the B-plus tree 31 (605), then the storage manager 21 invokes a normal RAID read operation on that PVBN at 609, to cause the requested data block to be read from the PPS subsystem 4.

If that PVBN is found in the B-plus tree 31 (605) (which means that the requested block is stored in the change log file), then the storage manager 21 identifies the FBN associated with that PVBN in the B-plus tree 31 and then reads that block from the change log file 30 at 606. More specifically, the storage manager uses the filename of the change log file 30 and the FBN of the requested block to walk down the buffer tree 43 that represents the change log file 30, to locate the requested block. At 607 the storage manager 21 replaces the file system context metadata for that block with its original file system context metadata, stored in the corresponding FBN of the file system context file 32. The block is then returned to the requester at 608.

Figure 8:
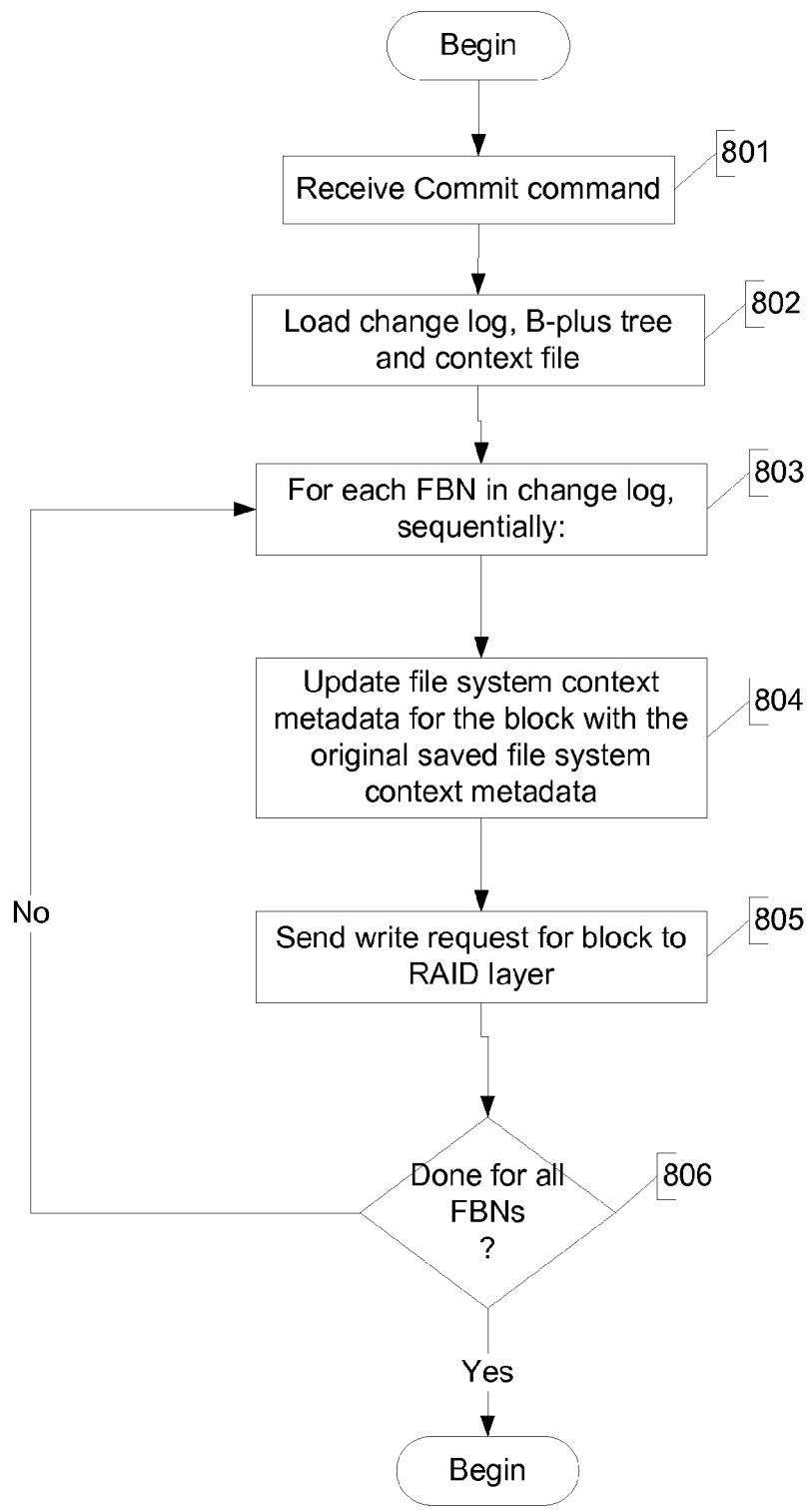
FIG. 8 is a flow diagram illustrating a process of committing a potential remedial change to a volume in response to a user's approval of such change.

FIG. 8 illustrates in greater detail the process of committing a potential remedial change to a volume (file system) in response to a user's approval of such change. The change is represented in the form of one or more data blocks stored in a change log file. Initially, at 801 a Commit command is received. The Commit command may be a user input received via a user interface, or it may be a system command generated in response to a user input. At 802 the storage manager 21 loads into memory the change log file 30 and file system context file 32 associated with the change (in practice, these will likely already reside in memory, since the optional commit process will typically be performed soon after the check process has completed).

The following operations are then performed for each block (803, 806) in the change log file 30, in the order of their FBNs. Note that this process can be performed on a tetris-by-tetris basis, rather than block-by-block, or in other units of data, as long as the original ordering of blocks in the change log file is maintained.

First, at 804 the storage manager 21 updates the context information of the block with the original saved context information from the file system context file 32. Then, at 805 the storage manager 21 sends a write request for the block to the RAID layer 24, to cause the block to be written to the PPS subsystem 4. In practice, the storage manager 21 may actually send a group of blocks (e.g., a tetris or multiple tetrises) to the RAID layer 24 at one time. Note that the normal write allocation process does not have to be repeated for any of the blocks during this process. The system simply uses the PVBN that was assigned to each block previously during the normal write allocation process, as described above regarding FIG. 5.

In the above described embodiments, blocks are written to the change log file 30 in the order of their FBNs, and during the commit process they are read back from the change log file 30 and written to persistent storage in that same order. In another embodiment, however, blocks representing potential changes do not need to be written to the change log file 30 read from the change log file 30 in any particular order, at least within a given consistency point. For example, in one embodiment, blocks written to the change log file 30 are grouped by consistency points, and consistency point block groupings are written to the change log file 30 in sequential order; however, the ordering of blocks within any particular consistency point grouping in the change log file 30 does not matter. Consistency point groupings within the change log file 30 can be delineated by writing a superblock or other similar indicator to the change log file 30 during a consistency point, immediately after the last block is written to the change log file 30 for that consistency point.

Figure 9:
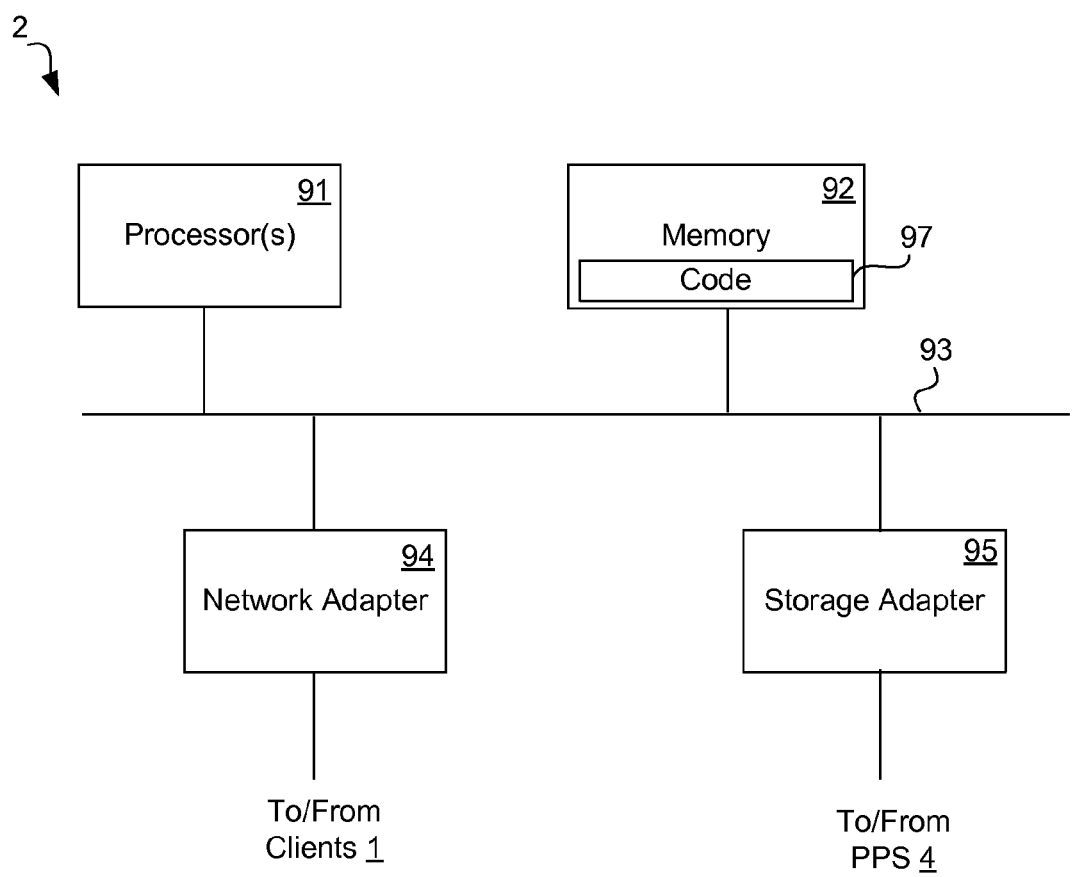
FIG. 9 is a high-level block diagram showing an example of the architecture of a storage server.

FIG. 9 is a high-level block diagram showing an example of the architecture of the storage server 2, which as noted above can implement the techniques introduced here. The storage server 2 includes one or more processors 91 and memory 92 coupled to an interconnect 93. The interconnect 93 shown in FIG. 9 is an abstraction that represents any one or more separate physical buses, point-to-point connections, or both, connected by appropriate bridges, adapters, or controllers. The interconnect 93, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 91 is/are the central processing unit (CPU) of the storage server 2 and, thus, control the overall operation of the storage server 2. In certain embodiments, the processor(s) 91 accomplish this by executing software or firmware stored in memory 92. The processor(s) 91 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 92 is or includes the main memory of the storage server 2. The memory 92 represents any form of random access memory (RAM), read-only memory (ROM), flash memory, or the like, or a combination of such devices. The memory 92 can contain code 97 which may embody, among other things, the storage operating system 20.

Also connected to the processor(s) 91 through the interconnect 93 are a network adapter 94 and a storage adapter 95. The network adapter 94 provides the storage server 2 with the ability to communicate with remote devices, such as hosts 1, over the interconnect 3 and may be, for example, an Ethernet adapter or Fibre Channel adapter. The storage adapter 95 allows the storage server 2 to access the storage subsystem 4 and may be, for example, a Fibre Channel adapter or SCSI adapter.

Thus, a method and apparatus for detecting and fixing data and metadata errors in a network storage server, while the network storage server remains online, including allowing a user to approve or disapprove remedial changes before the changes are committed to stable storage, have been described.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method, comprising:
   detecting errors in a volume of a network storage server while the network storage server remains available for servicing client requests;
   identifying a potential change to the volume for resolving an error, while the network storage server remains available for servicing the client requests;
   writing modified data blocks representing the potential change to a log which resides outside the volume to bypass automatic writing of data for resolving the error to a persistent storage facility of the network storage server and to preserve a consistent image of a file system of the network storage server; and
   in response to receiving a user input indicating that the potential change should be committed, committing the potential change to the volume by
      reading the modified data blocks from the log, and
      writing the modified data blocks to the persistent storage facility of the network storage server in an order in which the modified data blocks were read from the log.

2. The method of claim 1, wherein writing modified data blocks representing the potential change to the log which resides outside the volume comprises appending the modified data blocks to sequential logical blocks of the log; and
   wherein reading the modified data blocks from the log comprises reading the modified data blocks from the log in an order in which the modified data blocks were written to the log.

3. The method of claim 1, further comprising, prior to committing the potential change to the volume:
   receiving in the network storage server a read request which targets an existing data block managed by the network storage server; and
   in response to the request,
      determining a first block pointer of the existing data block,
      using the first block pointer of the existing data block as a lookup key to lookup, in an ancillary data structure, a second block pointer pointing to a particular logical block of the log,
      reading a data block stored in the particular logical block of the log, and
      returning the read data block to a sender of the read request.

4. The method of claim 3, wherein the first block pointer is a RAID-level physical block pointer and the second block pointer is a logical file block pointer.

5. The method of claim 3, wherein the ancillary data structure is a B-plus tree.

6. The method of claim 1, further comprising:
   prior to committing the potential change to the volume, outputting to a user interface an indication of the potential change, and enabling user input via the user interface to accept the potential change.

7. The method of claim 6, further comprising preventing writes to all physical storage devices included in the volume, until after the user input is received.

8. The method of claim 1, wherein the log is stored in a root volume of the network storage server separate from the volume.

9. A network storage server, comprising:

a memory containing machine readable medium comprising machine executable code having stored thereon instructions for performing a method of maintaining data consistency;

a processor coupled to the memory, the processor configured to execute the machine executable code to:

service read and write requests directed to a file system from a plurality of storage clients on a network, including writing data to a persistent storage facility in response to write requests by using a write allocation process;

execute a file system error detection process to detect an error in the file system; and identify a potential change to the file system for resolving the error while the network storage server remains available for servicing client requests, to enable a user to approve or disapprove the potential change before the potential change is committed to the file system, and to commit the potential change to the file system when the potential change is approved by the user, such that the write allocation process is not invoked to commit the potential change to the file system until after the user approves the potential change.

10. The network storage server of claim 9, wherein the processor is further configured to execute the machine executable code to enable the user to approve or disapprove the potential change before the potential change is committed to the file system by storing modified data blocks representing the potential change in a logical data container outside the file system to preserve a consistent image of the file system, at least until a user input is received indicating approval or disapproval of the potential change.

11. The network storage server of claim 10, where the processor is further configured to execute the machine executable code to prevent writes to all physical storage devices included in the file system, until after the user input is received.

12. The network storage server of claim 11, wherein the processor is further configured to execute the machine executable code to:

respond to receiving the user input by committing the potential change to the file system, including reading the modified data blocks from the logical data container outside the file system, and writing the modified data blocks to the persistent storage facility of the network storage server.

13. The network storage server of claim 12, wherein writing the modified data blocks to the persistent storage facility comprises:

writing the modified data blocks to the persistent storage facility in a same order in which the modified data were written to the logical data container outside the file system.

14. The network storage server of claim 13, wherein the processor is further configured to execute the machine executable code to, prior to committing the potential change to the file system:

store, for each of the modified data blocks, a key-value pair for the modified data block in a data structure, wherein the key of the key value pair is a RAID-level physical block pointer for a corresponding modified data block and the value is a logical file block pointer representing a logical position of the modified data block within the logical data container outside the file system;

receive in the network storage server a read request which targets an existing data block managed by the network storage server; and in response to the request, determine a physical block pointer of the existing data block, use the physical block pointer of the existing data block as a lookup key to lookup a corresponding value in the data structure, the corresponding value being a logical file block pointer pointing to a particular logical block in the logical data container, read a data block stored in the particular logical block of the logical data container, and return the read data block to a sender of the read request.

15. A non-transitory machine readable medium having stored thereon instructions for performing a method of handling a read request, comprising machine executable code which when executed by at least one machine, causes the machine to:

detect errors in a volume of a network storage server while the network storage server remains available for servicing client requests;

identify a potential change to the volume for resolving an error, while the network storage server remains available for servicing the client requests;

write modified data blocks representing the potential change to a log file which resides outside the volume to bypass automatic writing of data for resolving the error to a persistent storage facility of the network storage server and to preserve a consistent image of a file system of the network storage server;

in response to receiving a read request for reading a data block of a data file in the volume, determine whether the log file residing outside the volume includes a modified version of the data block; and satisfy the read request by reading the modified version of the data block from the log file, if the log file includes the modified version of the data block.

16. The non-transitory machine readable medium of claim 15, wherein the machine executable code which when executed by at least one machine, further causes the machine to:

satisfy the read request by reading the data block from the data file in the volume, if the log file residing outside the volume does not include the modified version of the data block.

17. The non-transitory machine readable medium of claim 15, wherein the machine executable code which when executed by at least one machine, further causes the machine to:

replace file system context metadata for the modified version of the data block within the log file with original file system context metadata for the data block of the log file.

* * * * *